United States Patent [19]

Kretschmer et al.

[11] 3,760,140

[45] June 5, 1973

[54] SUBMERGED-ARC WELDING WITH STRIP ELECTRODE AND FOAMED FLUX

[75] Inventors: Ingo Kretschmer, Lohhof; Marjan Mursic, Munich, both of Germany

[73] Assignee: Messer Griesheim GmbH, Frankfurt/Main, Germany

[22] Filed: Apr. 16, 1971

[21] Appl. No.: 134,906

[30] Foreign Application Priority Data
Apr. 24, 1970  Germany.................. P 20 20 047.9

[52] U.S. Cl.......................... 219/73, 148/24, 148/26
[51] Int. Cl............................................. B23k 9/18
[58] Field of Search....................... 219/73, 74, 137, 219/146; 148/24, 26

[56] References Cited
UNITED STATES PATENTS

| | | | |
|---|---|---|---|
| 3,571,553 | 3/1971 | Godai ................................ | 219/73 |
| 3,271,554 | 9/1966 | Johnson .............................. | 219/76 |
| 3,201,292 | 8/1965 | Miltschitzky et al. ............... | 148/26 |
| 3,588,432 | 6/1941 | Arnoldy .............................. | 219/73 |
| 3,329,798 | 7/1967 | Johnson .............................. | 219/73 |
| 3,264,445 | 8/1966 | Arnoldy .............................. | 219/73 |
| 3,102,025 | 8/1963 | Wilcox ................................ | 219/73 |

FOREIGN PATENTS OR APPLICATIONS 1,086,288  12/1922  Great Britain ....................... 219/73

Primary Examiner—J. V. Truhe
Assistant Examiner—George A. Montanye
Attorney—Millen, Raptes & White

[57] ABSTRACT

To obtain higher quality welds in the submerged-arc welding of electrode strips having a width to thickness ratio above 90 : 1, there is employed a flux having a bulk density of 0.4–0.8 kg./l., e.g. a foamed flux. The process is especially applicable to the economical production of stainless steel clad vessels and the like.

13 Claims, No Drawings

SUBMERGED-ARC WELDING WITH STRIP ELECTRODE AND FOAMED FLUX

BACKGROUND OF THE INVENTION

This invention relates to the submerged-arc welding process wherein welds are built up by melting off a continuously-fed strip electrode.

For a general discussion of submerged arc welding, reference is directed to "Welding Handbook," Sixth Edition, Section Two, Chapter 24, Americal Welding Society, 345 East Forty-Seventh Street, New York, New York 10017.

It is known that by means of such processes using strip electrodes, it is possible to make wide, flat weld beads resulting in economically built-up weldings; however, the ratio of width to thickness of the strip electrodes must be at least 16 : 1. This procedure of building up welds with strip electrodes, especially by the submerged-arc welding method, has proven especially advantageous in boiler construction particularly where special purpose alloys are clad onto a base metal such as structural steel, e.g. stainless steel clad vessels.

Recently, attempts have been made to improve the economics of this welding method by increasing the width of the strip electrode. For this purpose there have already been utilized strip electrodes having a ratio of width to thickness on the order of magnitude of 120 : 1. It was discovered, however, that the quality of the deposited weldings decreases as the width of the strip electrodes is increased.

For a general discussion of submerged strip electrode arc welding reference is directed to U.S. Pat. No. 2,848,593.

SUMMARY OF THE INVENTION

An object of this invention is to provide an improved submerged-arc welding process with strip electrodes so that high quality welds can be formed.

Another object is to provide a welding process capable of forming flawless welds having smooth surfaces, even in the case of wide welds.

Upon further of the specification and appended claims, other objects and advantages of the present invention will become apparent.

To attain these objects, there is employed with a strip electrode having a width to thickness ratio greater than 90 : 1, preferably between 110 : 1 and 130 : 1, a foamed welding flux having a bulk desnity of 0.4 – 0.8 kg./l.

DETAILED DISCUSSION OF THE INVENTION

Without being bound by an explanation of the mechanism of the invention, it appears that the low bulk density of the welding flux prevents any deformation of the surface of the relatively large welding bath, this effect being surprisingly substantially independent of the thickness of the flux. This combination of a specific minimum width to thickness ratio and a specific bulk density of the welding flux makes it possible to obtain notch-free and smooth surfaces of the weld beads. As a matter of fact, the quality of the welds is so high that it is possible to use a single-pass welding technique. With respect to the maximum width to thickness ratio that can be employed, it was found that good results are yielded up to a ratio of 300 : 1.

It is particularly advantageous, to use strip electrode having a width to thickness ratio of 110 : 1 to 130 : 1 since, in this case, the penetration depth can be kept low and uniform. The technical significance of just this property permits only minor fusing of the base material, resulting in only a slight change in the integrity of the alloy content of the welding material. This major advantage, in addition to the high quality of the deposited weld, generally cannot be attained with the use of heavy welding fluxes having bulk densities of more than 1.2 kg./l., as heretofore utilized for strip welding.

In quantitative terms, the electrode strips vary in width and thickness depending on the job, for example, 36 to 150 mm. wide and 0.4 to 1.0 mm. thick.

This invention is especially advantageous in the welding of cladding on mild and low-alloy structural steels, wherein the claddings consist of stabilized or unstabilized austenitic chrome-nickel or chrome-nickel-molybdenum steels. The welding of claddings of heat-resistant chrome-nickel steels, ferritic and martensitic chrome steels, nickel alloys, and cobalt-tungsten alloys is likewise facilitated by this invention.

As the welding flux having a bulk density of 0.4–0.8 kg./l., a so-called foamed flux is advantageously employed. Such a flux is obtained by foaming the molten base composition by pouring same into water, and then drying the resultant pieces of foam. The material is then optionally comminuted into smaller particles. The thus-produced particles of flux can be advantageously intermingled or coated with further components, e.g. deoxidants and/or alloying materials; this can be done in a agglomerating process, for example. Owing to the relatively low consumption of the foamed fluxes, this invention is especially economical; furthermore, as stated previously, the metallurgical reactions during the welding process are significantly improved.

The average particle size of the foamed fluxes is desirably in the range of 0.3 to 2.0, preferably 0.8 to 1.7 millimeters. For further information regarding the production of such foams, attention is invited to the following reference, incorporated herein:

German Auslegeschrift 1 193 774
German Auslegeschrift 1 251 133.

All of the flux compositions being disclosed therein and having a bulk density of 0.4 – 0.8 kg/l being useful in the present invention.

A welding flux particularly advantageous for cladding alloyed steels consists essentially of 40–50% $SiO_2$, 11–17% CaO, 22–28% MgO, and 10–16% fluorides, on a weight basis. Aside from density considerations, such a welding flux differs from fluxes employed previously for welding with strip electrodes in that: (a) it does not contain any manganese oxide and (b) it has a relatively high content of silicon dioxide. Such a flux composition permits the use of a converse composition of strip electrodes, i.e. strips having a higher manganese content and a lower silicon content then conventional electrodes, and results in improved bead shapes. Such fluxes also exhibit temperature and viscosity characteristics optimum for cladding steel; and a still further noteworthy advantage is that with these fluxes, the work is not glazed with slag, which otherwise would entail a cleaning operation.

In the use of the process of this invention for the welding of stainless steel claddings, for example, on mild structural steels, it is preferred practice to correlate the composition of the strip electrodes to the metallurgical effect of the flux. Chromium Burn-out of (about 1 percent) in particular must be compensated for by over-alloying the strip with chromium.

For the welding of stainless and wear-resistant steel claddings, a strip electrode is preferably employed having at least 14 percent chromium and a carbon content of below 0.2 percent.

For steel claddings substantially austenitic in structure, a process is advantageously employed wherein a flux is utilized having a bulk density of 0.4–0.8 kg./l. combined with a strip electrode of alloy steel, wherein the steel contains 22.0–24.5% Cr, 11.0–13.0% Ni, 1.8–2.3% Mn, 0.1–0.6% Si, and less than 0.03% C. To improve the corrosion resistance, these strip electrodes can be additionally alloyed with 0.6–0.9% niobium. A ferrite-containing single-pass austenite cladding produced with such a strip electrode in accordance with the process of this invention on plain [non-alloyed] steel contains, as shown by experiments, 17.5–22.0% Cr, 9.5–12.0% Ni, 0.8–1.3 % Mn, 0.7–1.2% Si, 0.3–0.6% Nb, and less than 0.06% C. From a comparison of this analysis with the analysis of the strip electrode, the maintenance of the integrity of the cladding when using the process of this invention can be directly perceived.

In order to produce a purely austenitic steel alloy, a strip electrode is employed preferably in combination with a flux of a low bulk density, which electrode contains 19.5–22.5% Cr, 14.0–16.5% Ni, 2.5–3.5% Mo, 1.8–2.8% Mn, less than 0.5% Si, and less than 0.03% C. In general, the process of this invention, as mentioned above, makes it possible to produce such claddings in a single pass; however, particularly in case of austenitic steel claddings, it is often desirable to obtain a sufficient, particularly corrosion-resistant cladding of a low carbon content. For such an application, an embodiment of the process of this invention is of special advantage wherein the first layer is welded by means of a strip electrode of the last-mentioned composition, and the second layer with a strip electrode of steel containing 17.0–20.0% Cr, 12.5–14.5% Ni, 2.5–3.5% Mo, 1.8–2.5% Mn, less than 0.5% Si, and less than 0.025% C, both in combination with a flux of a low bulk density.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A mild steel was cladded using a strip electrode in combination with a flux of a low bulk weight performed with the following data (compositions on a weight basis):

a. Composition of the base material: Cr: 0.44 %; Ni: 0.39 %; Mo: 0.66 %; Mn: 0.84 %; Si: 0.21 %; C: 0.20 %; Remainder: Fe.

b. Composition of the strip electrode: Cr: 24.0 %; Ni: 12.0 %; Mn: 2.1 %; Si: 0.4 %; C: 0.025 %; Nb: 0.8 %; Remainder: Fe.

c. Composition of the cladding (substantially austenitic): Cr: 20.2 %; Ni: 10.3 %; Mn: 1.1 %; Si: 0.9 %; C: 0.05 %; Nb: 0.5 %; Remainder: Fe.

d. Width to thickness ratio of the strip electrode: 120 : 1.

e. Composition of the welding flux (foamed): $SiO_2$: 46 %; CaO: 14 %; MgO: 27 %; Fluorides: 13 %.

f. Density of the welding flux: 0.6 kg/l.

g. Particle size of the welding flux (average): 1.2 mm.

h. Data of welding: Type of current: DC; Source of current: CP; Amperage: 600 A; Voltage: 29 V; Speed of welding: 100 mm/min.

EXAMPLE 2

A mild steel was cladded using a strip electrode in combination with a flux of a low bulk weight performed with the following data (compositions on a weight basis):

a. Composition of the base material: Cr: Traces; Ni: Traces; Mn: 0.7 %; Si: 0.3 %; C: 0.2 %; Remainder: Fe.

b. Composition of the strip electrode: Cr: 23.5%; Ni: 11.0 %; Mn: 2.2 %; Si: 0.3 %; C: 0.02 %; Remainder: Fe.

c. Composition of the cladding (substantially austenitic): Cr: 20.0 %; Ni: 10.1 %; Mn: 1.1 %; Si: 1.0 %; C: 0.045 %; Remainder: Fe.

d. Width to thickness ratio of the strip electrode: 120 : 1.

e. Composition of the welding flux (foamed): $SiO_2$: 46 %; CaO: 14 %; MgO: 27 %; Fluorides: 13 %.

f. Density of the welding flux: 0.55 kg/l.

g. Particle size of the welding flux (average): 1.3 mm.

h. Data of welding: Type of current: DC; Source of current: CP; Amperage: 600 A; Voltage: 30 V; Speed of welding: 95 mm/min.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the submerged-arc welding process comprising welding with a continuously fed strip electrode having a ratio of width to thickness of higher than 90 : 1, the improvement comprising employing a foamed flux having a bulk density of 0.4–0.8 kg./l.

2. A process as defined by claim 1 wherein the ratio of width to thickness is 110 : 1 to 130 : 1.

3. A process according to claim 1 wherein the width to thickness ratio is not higher than 300:1.

4. A process according to claim 1 wherein the thickness of the strip is 0.4–1.0 mm.

5. A process according to claim 1, wherein said welding is of cladding onto mild or low-alloy structural steel, said cladding formed of said strip, said strip being a metal selected from the group consisting of heat resistant chrome-nickel steel, ferritic chrome steel, martensitic chrome steel, a nickel alloy, and a cobalt-tungsten alloy.

6. A process according to claim 1, wherein said welding is of cladding onto mild or low-alloy structural steel, said cladding formed of said strip, said strip being a steel selected from the group consisting of stabilized austenitic chrome-nickel-molybdenum steel, unstabilized chrome-nickel steel, and unstabilized chrome-nickel-molybdenum steel.

7. A process according to claim 5 wherein said flux comprises, on a weight basis, 40–50% $SiO_2$, 11–17% CaO, 22–28% MgO, and 10–16% fluorides.

8. A process according to claim 7 wherein said strip electrode is a chrome steel containing, on a weight basis, at least 14% Cr, with less than 0.2% C.

9. A process according to claim 5 wherein said strip electrode is a chrome steel containing, on a weight basis, at least 14% Cr, with less than 0.2% C.

10. A process according to claim 5 wherein said cladding is substantially austenitic, and said strip electrode is a steel containing, on a weight basis, 22.0–24.5% Cr, 11.0–13.0% Ni, 1.8–2.3% Mn, 0.1–0.6% Si, and less than 0.03% C.

11. A process according to claim 10 wherein said strip electrode further contains 0.6–0.9% Nb.

12. A process according to claim 5 wherein said cladding is a purely austenitic steel, and said strip electrode is a steel containing on a weight basis 19.5–22.5% Cr, 14.0–16.5% Ni, 2.5–3.5% Mo, 1.8–2.8% Mn, less than 0.5% Si, and less than 0.03% C.

13. A process according to claim 12 further comprising welding a second strip electrode having a ratio of width to thickness of higher than 90:1 over the deposit of said strip electrode, said second strip being a steel containing, on a weight basis, 17.0–20.0% Cr, 12.5–14.5% Ni, 2.5–3.5% Mo, 1.8–2.5% Mn, less than 0.5% Si, and less than 0.025% C.

* * * * *

UNITED STATES PATENT OFFICE
CERTIFICATE OF CORRECTION

Patent No. 3,760,140            Dated June 5, 1973

Inventor(s) INGO KRETSCHMER ET AL

It is certified that error appears in the above-identified patent and that said Letters Patent are hereby corrected as shown below:

Claims 7, 9, 10 and 12: change the dependency from "claim 5" to -- Claim 6 --.

Signed and sealed this 9th day of April 1974.

(SEAL)
Attest:

EDWARD M. FLETCHER
Attesting Officer

C. MARSHALL DANN
Commissioner of Patents